United States Patent [19]

Uusitalo et al.

[11] 4,314,786
[45] Feb. 9, 1982

[54] METHOD AND APPARATUS FOR HANDLING CATHODE PLATE SUPPORT RODS

[75] Inventors: Leo Uusitalo, Tampere; Pertti Tuominen, Kaaro, both of Finland

[73] Assignee: Outokumpo Oy, Finland

[21] Appl. No.: 111,641

[22] Filed: Jan. 14, 1980

[51] Int. Cl.³ ............................................. B65G 57/18
[52] U.S. Cl. ....................................... 414/57; 414/82; 414/89; 414/786; 204/198
[58] Field of Search .................. 414/57, 68, 80–82, 414/89, 786; 204/198, 286, 297 W

[56] References Cited
U.S. PATENT DOCUMENTS
4,069,925  1/1978  Ahokas et al. ...................... 414/69

FOREIGN PATENT DOCUMENTS
2401174  7/1975  Fed. Rep. of Germany ........ 414/57
 119834  9/1959  U.S.S.R. .............................. 414/57

*Primary Examiner*—Robert W. Saifer
*Attorney, Agent, or Firm*—Steinberg & Raskin

[57] ABSTRACT

Method and apparatus for handling cathode plate support rods include detaching the support rods from the cathode plate and transporting the same in a longitudinal direction over a transfer track to a support rod grouping station wherein the same are moved in a transverse direction by pushing apparatus associated with grouping apparatus whereupon the support rods are received on bunching guides of bunching apparatus, the bunching apparatus being arranged to pack the groups of support rods in layers within a transporting and storage crate.

15 Claims, 2 Drawing Figures

METHOD AND APPARATUS FOR HANDLING CATHODE PLATE SUPPORT RODS

BACKGROUND OF THE INVENTION

This invention relates generally to methods and apparatus in electrolytic refining plants for handling support rods detached from cathode plates and, more particularly, to such methods and apparatus wherein the manual labor normally required in handling cathode plate support rods is eliminated and which permit an efficient arrangement of associated equipment in the refining plant.

In electrolytic refining plants and, in particular, in plants for effecting electrolytic purification of copper, the support rods for the cathode plate circulate throughout the plant. Thus, the cathodes are normally removed from the electrolysis tanks after the same attain a suitably large thickness whereupon the support rods of the cathode plates are then detached therefrom. New seed plates are then suspended from the same support rods whereupon the electrolysis operation is renewed.

Methods and apparatus for mechanizing the manufacturing of cathode plates are disclosed in German Pat. No. 1,188,299 and Finnish Pat. No. 46,266. The above-mentioned German Patent discloses an arrangement wherein the support rods require a manual handling, i.e., require manipulation by hand. In the arrangement disclosed in the above-mentioned Finnish Patent, the line on which the seed plates are manufactured and the line on which the cathode plates are dismounted are necessarily located side by side and parallel to each other. Additionally, the spacing between these lines is of necessity fixed within close limits thereby resulting in a relatively strict and inflexible arrangement of the equipment and, additionally, rather large space requirements.

SUMMARY OF THE INVENTION

Accordingly, one object of the present invention is to provide new and improved methods and apparatus for handling support rods of cathode plates which overcome the disadvantages mentioned above in connection with conventional methods and apparatus of this type.

Another object of the present invention is to provide new and improved methods and apparatus wherein the work involved in piling the heavy support rods which has in the past required substantial manual labor, can be entirely eliminated.

Still another object of the present invention is to provide new and improved methods and apparatus for handling cathode plate support rods wherein a wide range of variations in the possible location of the various equipment utilized in the plant such, for example, as the seed plate manufacturing machine, the cathode plate dismantling machine and the electrolysis tank hall, is obtained.

Briefly, in accordance with the present invention, these and other objects are attained by providing a method for handling cathode plate support rods comprising the steps of detaching the support rods from the cathode plate and transporting the same in a longitudinal direction to a support rod grouping station wherein the support rods are grouped to form a group of supporting rods of predetermined size. Such grouping is achieved by moving the supporting rods at the grouping station in a transverse direction. After the support rods are so grouped, each group is packed as a separate layer into a transporting and storage crate.

The apparatus of the present invention includes a transfer track on which the support rods which have been detached from the cathode plates are moved in a longitudinal direction. Grouping apparatus are provided which include pushing apparatus for moving the support rods which arrive at the grouping station in a transverse direction, the support rods being received on bunching guides forming a part of bunching apparatus. The bunching apparatus are adapted to pack the support rod groups in layers into a transporting and storage crate.

The method and apparatus of the present invention as described above results in several important advantages being obtained relative to conventional arrangements of the prior art. For example, a wide range of variations are possible in the mutual placement of the various plant equipment such, for example, as the seed plate manufacturing machine, the cathode plate dismantling machine and the electrolysis tank hall, whereby efficient use of transport equipment such as cranes and the like as well as efficient utilization of space can be obtained, especially in the modernization of older refining plants.

The method and apparatus of the present invention enables a storage of the support rods which facilitates an equalization of any differences in operating speed in the various areas of the plant by means of the transporting crates utilized therein with consequent economies being obtained in both cost and space.

Further, the present invention provides for a total elimination of the support rod piling operations normally requiring strenuous manual effort such that other than operators of hoists and transport equipment in general, only supervisory personnel are required.

DESCRIPTION OF THE DRAWINGS

A more complete appreciation of the present invention and many of the attendant advantages thereof will be readily appreciated as the same becomes better understood by reference to the following detailed description when considered in connection with the accompanying drawings in which.

DESCRIPTION OF THE PREFERRED EMBODIMENTS

Figure 1:
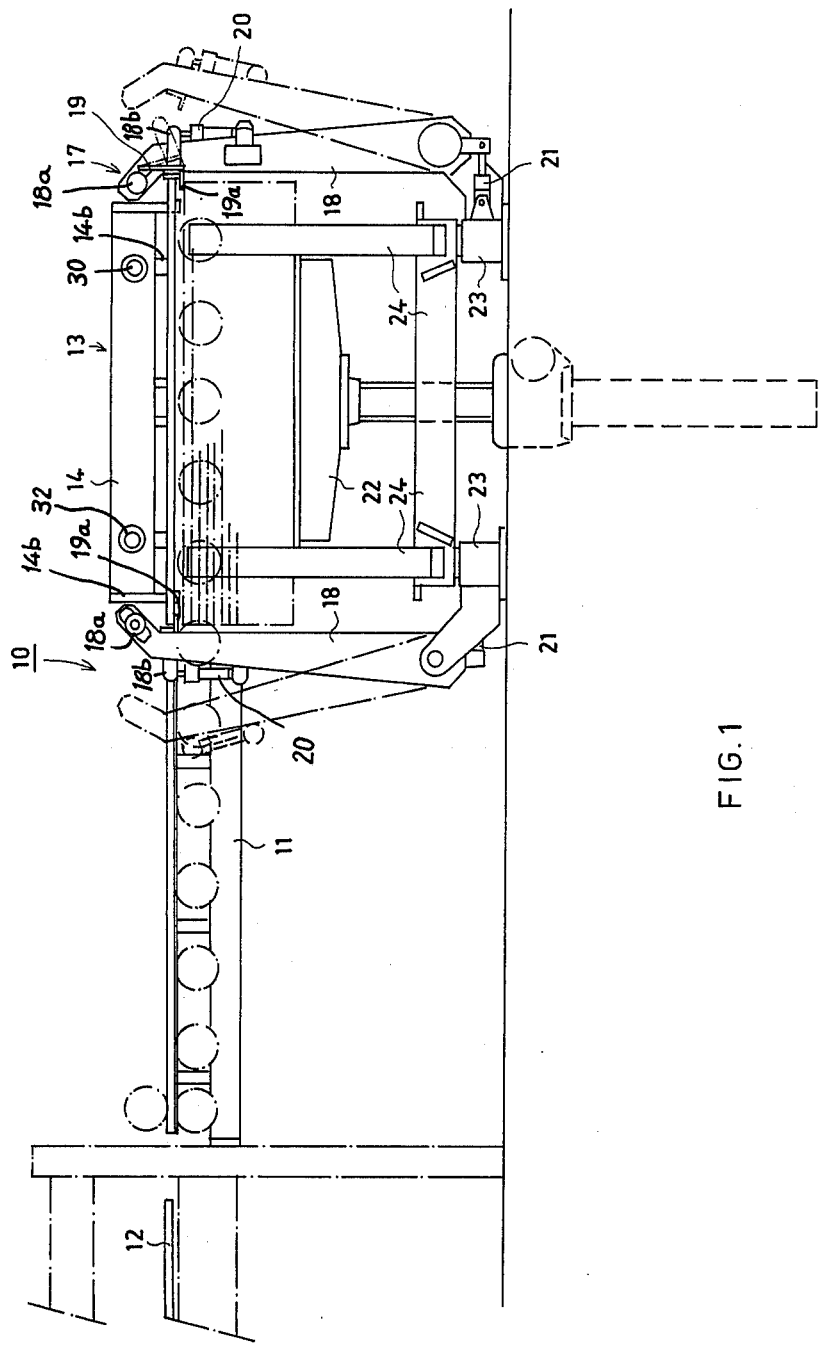
FIG. 1 is a side elevation view of the apparatus of the present invention which is adapted to carry out the method thereof.

Referring now to the drawings wherein like reference characters designate identical or corresponding parts throughout the several views, the handling apparatus of the present invention, generally designated 10, includes a longitudinally extending transport track 11 on which support rods 12 which have been detached from the cathode plates are moved in their longitudinal direction into a grouping station. Thus, prior to being disposed on the transport track 11, the support rods 12 have been detached from cathode plates which have reached their full thickness in the electrolysis operation, such detachment being accomplished by any conventional means such, for example, as the over turning and bunching apparatus disclosed in applicant's Finnish Pat. No. 51 800.

At the grouping station of the handling apparatus 10 is provided bunching apparatus 13 comprising pushing apparatus 14 associated with activating means 15. The pushing apparatus 14 includes a longitudinally extending member 14a from which a plurality of depending members 14b downwardly extend, the lower end of which are adapted to engage the sides of the support rods 12 as the same are transported to the grouping station. The activating apparatus 15 preferably comprises a hydraulic or pneumatic power cylinder operatively associated with the pushing apparatus 14 in a manner such that upon activation thereof, the pushing apparatus undergoes a reciprocating motion as indicated by the arrow A (FIG. 2), the pushing apparatus 14 being supported during such reciprocating movement on a pair of guide rods 30 which extend through bores 32 formed in the pushing apparatus 14.

The apparatus 10 further includes at the grouping station bunching apparatus, generally designated 17, comprising spaced, opposed frames 18, each of which has associated therewith a respective bunching guide 19 and activating apparatus 20, the latter serving to turn or pivot the respective bunching guide 19. Thus, each frame 18 comprises and upwardly extending plate having an inwardly angled upper portion. Each bunching guide 19 comprises an angle member having a normally horizontal flange 19a, the bunching guide 19 being pivotally connected to the inwardly directed upper end of its respective frame 18 at a pivot point 18a. The activating apparatus 20 which preferably comprises a hydraulic or pneumatic cylinder has one end affixed to the respective frame 18 and the other end, i.e., the end of the piston rod, affixed to a plate 18b which is itself affixed to the respective bunching guide 19 so that upon activation thereof, the bunching guide 19 can pivot as illustrated in phantom in FIG. 1 so that the flange 19a is no longer horizontal but is angled downwardly and is spaced outwardly from its normally horizontal position.

Each frame 18 of the bunching apparatus 17 is itself pivotally attached to the frame 23 of a depositing table 22, described below. Activating apparatus 21 is associated with each of the respective frames 18 and preferably comprise a hydraulic or pneumatic cylinder which, upon activation, serves to turn or pivot the respective frame 18 outwardly as illustrated in phantom in FIG. 1.

Figure 2:
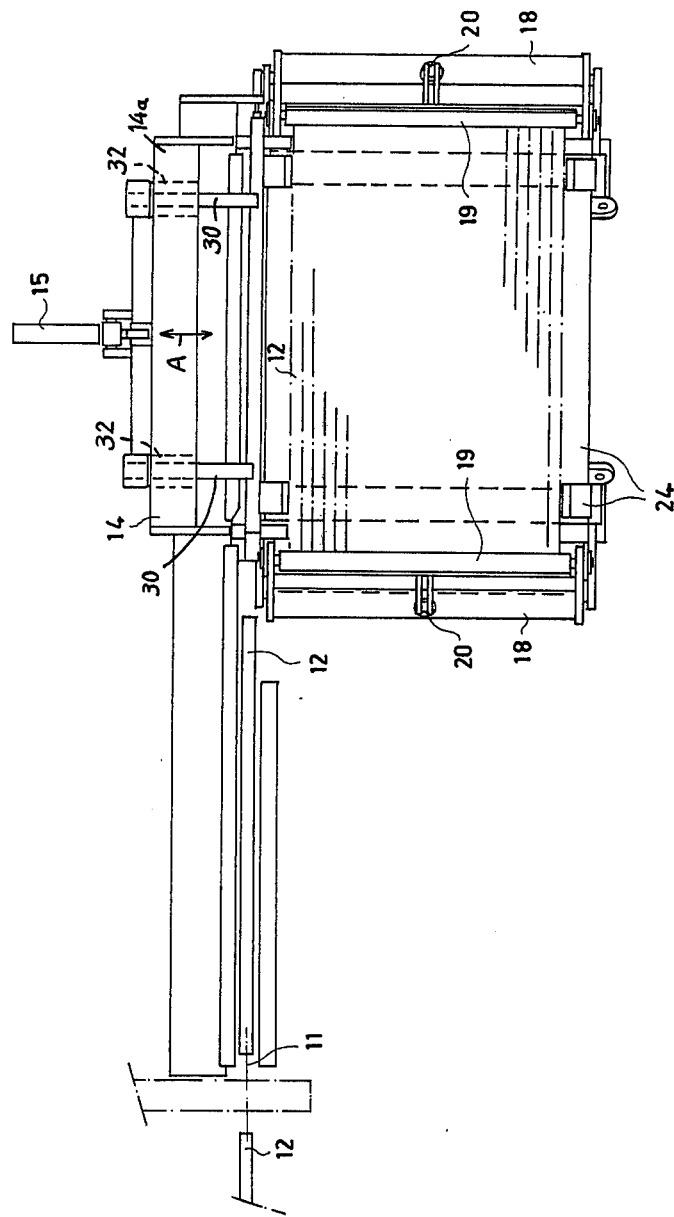
FIG. 2 is a top plan view of the apparatus illustrated in FIG. 1.

The bunching guides 19 are normally located so that the flanges 19a thereof are positioned to receive the support rods 12 at the grouping station as the same are pushed by the pushing apparatus 14 of the grouping apparatus 13 in the transverse direction as indicated by arrow A in FIG. 2. In this manner, as each support rod 12 is transported in its longitudinal direction into the grouping station it is located adjacent to the depending members 14b of pushing apparatus 14. When the support rod is so positioned, the activating apparatus 15 is activated to reciprocate the pushing apparatus 14 so as to move the support rod which is contacted by the depending members 14b in a transverse direction so that the respective ends of each support rod are supported by the respective flanges 19a of the bunching guides 19. In this manner a group of support rods of predetermined size is formed. As noted above, each of the bunching guides 19 is pivotally attached to the respective frame 18 of the bunching apparatus 17 so that after an appropriate number of support rods 12 (for example 20 rods) have become grouped in the side by side manner illustrated in FIG. 2, the activating apparatus 20 are activated to pivot the bunching guides 19 to the withdrawn position indicated in phantom in FIG. 1 so that the flanges 19a thereof disengage the ends of the support rods.

The handling apparatus 10 of the present invention further includes a depositing table 22 having an upper planar surface, the table 22 being vertically moveable by means of a hydraulic column or the like. The depositing table 22 is disposed within the frame 23 mentioned hereinabove. Thus, upon an appropriate number of support rods 12 having been grouped in the side by side fashion illustrated in FIG. 1 through the reciprocation of the pushing apparatus of the bunching apparatus 13, the activating apparatus 20 are operated whereby the bunching guides 19 pivot outwardly as shown in phantom in FIG. 1 so that they disengage the ends of the grouped support rods whereupon the group of support rods become supported on the upper surface of the table 22 which is initially positioned directly beneath the flanges 19a of bunching guides 19. The table 22 is then indexed downwardly in a controlled manner such as by a photocell or other appropriate control means, a distance equal to the thickness of the support rods 12. Located between the frames 18 of the bunching apparatus 17 is a transporting and storage crate 24 into which the bunching apparatus 17 packs the layers of the support rods 12 which the grouping apparatus 13 has grouped together in a manner described below.

Thus, the handling apparatus of the present invention operates as follows. The support rods 12 are moved on the longitudinally extending transport track 11 into the grouping station whereupon the pushing apparatus 14 of the grouping apparatus 13 moves each support rod 12 to the near end of the bunching guides 19 of the bunching apparatus 17. At the same time, any support rods which have already been located on the bunching guides are urged forwardly by the newly positioned support rod so that the support rods already located on the bunching guides are moved forwardly along the breadth of the bunching guides. When a suitable number of support rods such, for example, as 20 of them, have been grouped in the side by side manner illustrated in FIG. 2, the activating apparatus 20 are operated so as to pivot the bunching guides 19 so that the flanges 19a thereof disengage from the ends of the support rods allowing the group of rods to be supported by the table 22. The table 22 then descends under the control of a photocell or other appropriate control means a distance equal to the thickness of one support rod whereupon the activating apparatus 20 are again operated to turn the bunching guides 19 back into the grouping position, i.e., the position shown by the solid lines in FIG. 1. The operations described above are then repeated until the transporting and storage crate 24 has been filled. At this time the activating apparatus 21 are operated to turn the frames 18 outwardly as illustrated by the dotted line positions of FIG. 1 so that the transporting storage crate 24 which has been filled can be removed and replaced by an empty crate utilizing a crane or similar apparatus.

In order to assure that the depositing of the group of rods from the bunching guides 19 onto the table 22 by operation of the bunching apparatus 17 will cause no interruption in the operation whereby the support rods 12 are detached from the cathode plates, the power cylinder comprising the activating apparatus 15 preferably is adapted to provide strokes of varying length. More particularly, during the grouping operation wherein the support rods are located in side by side relationship, the length of the stroke of the power cylinder 15 is substantially equal to the breadth dimension of one support rod 12. However, the final stroke of the power cylinder 15, i.e., the last stroke of the cylinder prior to the group of rods being deposited from the bunching guides 19 onto the table 22, has a length which corresponds to several (e.g., three) breadths of the support rod 12. In this manner, an intermediate storage space is defined between the transport track 11 and the transporting crate 24 so that a compensation is provided for the delay resulting from the time required to lower the group of rods on table 22.

The transporting crate 24 which is filled with the stacked groups of support rods is then conveyed to the seed plate manufacturing machine where it is emptied by means of suitable apparatus preferably comprising a longitudinal pusher operated by appropriate power cylinders to move the group of support rods which is uppermost in the transporting crate 24 onto a platform over the seed plate machine from where a feed conveyor moves the group of rods into a rod dispensing magazine. The support rods are then distributed on by one among the seed plates where they are associated therewith, one support rod being associated with a respective seed plate.

During the emptying operation described above, it is advantageous to place the transporting crate 24 onto an elevator table apparatus of the type described above securing the transporting crate 24 thereto. The elevator table which is preferably controlled by appropriate apparatus such as a photocell is adapted to adjust the vertical position of the uppermost group of rods in a manner such that it is appropriately positioned for the subsequent stroke of the longitudinal pusher so that the table is continuously indexed upwardly until the transporting crate 24 has been emptied and exchanged. Of course, it is possible to handle the group of support rods removed from the crate 24 in other ways known in the art such, for example, as disclosed in Finnish Pat. No. 46 266 when a transfer of the support rods from the platform into the magazine is accomplished by tilting the platform with the aid of power cylinders.

Obviously, numerous modifications and variations of the present invention are possible in the light of the above teachings. It is therefore to be understood that within the scope of the appended claims, the invention may be practiced otherwise then as specifically disclosed herein.

What is claimed is:

1. A method for handling support rods which have been detached from cathode plates in an electrolytic refining plant comprising the steps of:
   moving the support rods subsequent to their detachment from the cathode plate in a longitudinal direction to a support rod grouping station;
   arranging the support rods in the grouping station to form a group thereof having a predetermined size by moving the support rods one by one in a transverse direction a distance substantially equal to the breadth of a support rod with the exception of the last support rod in one group thereof and onto guide members on which the rods are supported so that the rods are in side by side relationship; and
   packing each group of support rods, one above the other in layers, in a transporting and storage crate.

2. A method as recited in claim 1 wherein said last support rod in one group of support rods which is moved onto the guide members is moved in the transverse direction a distance substantially equal to a multiple of the breadth of a support rod, whereby the support rods already moved onto the guide members are correspondingly moved the same distance.

3. A method as recited in claim 1 wherein said packing step comprises releasing said group of support rods after the same has been formed from the support of the guide members.

4. A method as recited in claim 3 wherein said packing step further comprises supporting the groups of support rods after the same is released from the guide members on a table which is adapted to be vertically moveable, and moving the table downwardly a distance substantially equal to the thickness of one support rod.

5. Apparatus for handling support rods which have been detached from cathode plates in an electrolytic refining plant comprising:
   transport track means for moving the support rods which have been detached from the cathode plates in a longitudinal direction to a grouping station;
   grouping means including pushing means for moving the support rods arriving at the grouping station in a transverse direction to form groups of support rods of predetermined size, said pushing means comprising activating means for producing a reciprocating movement having a length substantially equal to the breadth of one support rod; and
   bunching means including a frame assembly to which guide means are attached for receiving the support rods moved by the pushing means and on which the group of support rods is formed, said bunching means further being adapted to pack the groups of support rods in layers into a transporting and storage crate.

6. Apparatus as recited in claim 5 wherein said activating means comprises one of a hydraulic and pneumatic power cylinder.

7. Apparatus as recited in claim 5 wherein the length of the reciprocating movement of the last stroke of the activating means before packing a group of support rods is substantially equal to a multiple of the breadth of one support rod.

8. Apparatus for handling support rods which have been detached from cathode plates in an electrolytic refining plant comprising:
   transport track means for moving the support rods which have been detached from the cathode plates in a longitudinal direction to a grouping station;
   grouping means including pushing means for moving the support rods arriving at the grouping station in a transverse direction to form groups of support rods of predetermined size; and
   bunching means including a frame assembly to which guide means are attached for receiving the support rods moved by the pushing means and on which the group of support rods is formed, said guide means comprising a pair of guide members adapted to engage and support the ends of the support rods, the guide means being pivotally attached to the frame assembly of the bunching means, said bunching means further being adapted to pack the groups of support rods in layers into a transporting and storage crate.

9. Apparatus as recited in claim 8 further including activating means for pivoting the guide member so that the latter are disengaged from the ends of the support rods.

10. Apparatus as recited in claim 9 wherein said activating means comprise one of a hydraulic and pneumatic power cylinder.

11. Apparatus for handling support rods which have been detached from cathode plates in an electrolytic refining plant comprising:

transport track means for moving the support rods which have been detached from the cathode plates in a longitudinal direction to a grouping station;

grouping means including pushing means for moving the support rods arriving at the grouping station in a transverse direction to form groups of support rods of predetermined size; and bunching means including a frame assembly to which guide means are attached for receiving the support rods moved by the pushing means and on which the group of support rods is formed, said bunching means including activating means attached to the frame assembly which comprises a pair of frame members each of which is pivotally mounted, said activating means being adapted to pivot the frame members outwardly, said bunching means further being adapted to pack the groups of support rods in layers into a transporting and storage crate.

12. Apparatus as recited in claim 11 wherein said activating means comprise one of a hydraulic and pneumatic power cylinder.

13. Apparatus as recited in claim 11 further including a depositing table adapted to support groups of support rods as the same are packed in layers into the transporting and storage crate.

14. Apparatus as recited in claim 13 wherein said depositing table is mounted for movement in a vertical direction and further including control means for moving the depositing table a distance substantially equal to the thickness of one support rod during each packing step.

15. Apparatus as recited in claim 11 further including a depositing table adapted to support groups of support rods as the same are packed in layers into the transporting and storage crate and wherein each of the frame members is pivotally attached to a frame of the depositing table.

* * * * *